May 5, 1925.

W. L. McLAINE ET AL 1,536,680

CASING HEAD

Filed Sept. 28, 1922

INVENTORS;
WILLARD L. BOROUGH,
WILLIAM L. McLAINE,
By
Graham + Laun
ATTORNEYS.

Patented May 5, 1925.

1,536,680

UNITED STATES PATENT OFFICE.

WILLIAM L. McLAINE, OF LOS ANGELES, AND WILLARD L. BOROUGH, OF FULLERTON, CALIFORNIA.

CASING HEAD.

Application filed September 28, 1922. Serial No. 591,177.

*To all whom it may concern:*

Be it known that we, WILLIAM L. McLAINE, a citizen of the United States, residing at Los Angeles, in the county of Los Angeles, State of California, and WILLARD L. BOROUGH, a citizen of the United States, residing at Fullerton, in the county of Los Angeles, State of California, have invented a new and useful Improvement Comprising a Casing Head, of which the following is a specification.

Our invention relates to the production of oil as practiced in California and many other places. In the ordinary form of oil well, a casing is secured in the well and is cemented at or near its lower end to exclude water, and the tubing is suspended in the well extending down into the oil in the well. The oil flows or is pumped out through this tubing.

A casing head is a device which is secured to the upper end of the casing and which supports the tubing. It is an object of our invention to provide a novel form of casing head which has many advantages over the common forms of head as will be made evident hereinafter.

In the drawings, which are for illustrative purposes only,

Figure 1:
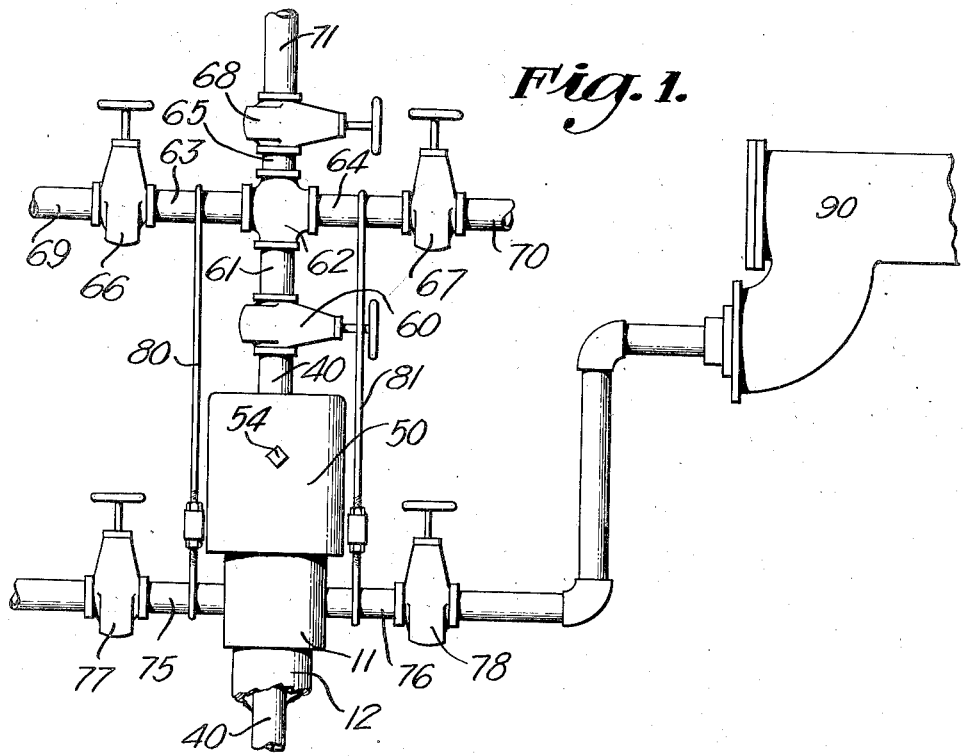
Fig. 1 is a side elevation of a casing head and certain associated members as assembled in an oil well.
Figure 2:
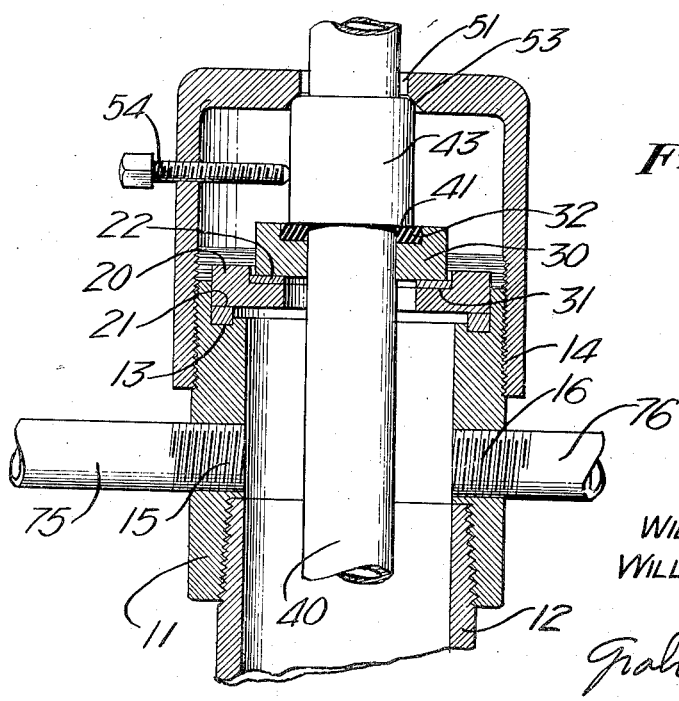
Fig. 2 is a section, on a somewhat larger scale than Fig. 1, of the casing head itself.

The casing head itself consists of a forged member 11 which is threaded at its lower end to attach to the casing 12 of the well to which it is applied and which is provided at its upper end with an annular seat 13 and an external thread 14. Tapped holes 15 and 16 are provided on either side of the head. Resting upon packing 21 set into the annular seat 13 is a casing head ring 20 which in turn has an annular seat 22. Resting upon packing 31 on the seat 22 is a tubing ring 30 which has also an annular seat 32. Resting upon packing 41 on the seat 32 is a collar 43 of the tubing 40. Threaded on the thread 14 is a bonnet 50 which has an opening 51 fitting upon the tubing 40 and a conical seat 53 fitting upon the tubing collar 43. Threaded in the bonnet 50 is a set screw 54 which may be screwed into engagement with the collar 43.

The casing head is connected as shown in Fig. 1. The tubing 40 has secured thereon a gate valve 60 to the upper end of which is connected by a nipple 61 a T 62. Nipples 63 and 64 connect into either horizontal branch of the T, and a nipple 65 connects into the upper branch thereof. Valves 66, 67 and 68 connect to the nipples 63, 64 and 65 respectively, these valves being in pipes 69, 70 and 71. Connected into the openings 15 and 16 of the member 11 are pipes 75 and 76, these pipes having gate valves 77 and 78 respectively. The members 80 and 81 are secured at their lower ends to the pipes 75 and 76 respectively, being secured at their upper ends to the nipples 63 and 64. The pipe 76 may be connected to a mud pump 90.

The method of operation of our invention is as follows: After setting the casing 12, and while the well is still full of heavy rotary mud, the tubing 40 is put in place and the various other devices are connected as shown and described above. This may be done before the casing is cemented and the tubing may then be used to carry the cement down into place by any of the well known circulating methods. In the event that it is desired to put a heavy pressure on the well during this operation, it can be done with safety by a suitable manipulation of the various valves. Also, if any excessive pressures should develop in the well they can be properly controlled.

It should be understood that a critical period in the drilling of a well comes after the bit has reached or nearly reached the desired oil sand. If possible, the operator tries to get his casing set and cemented before the well blows herself in and for this purpose he keeps the hole full of heavy mud. This mud supplies a superhydrostatic head which holds back the gas and oil pressure and drives the mud into the oil formations for the purpose of clogging them and preventing a premature flow. Having his casing in place, the operator then cements the lower end of the casing by forcing Portland cement down inside the casing and out around the lower end thereof and back towards the surface of the ground by first establishing a water circulation around the same path and then following it by the cement under pressure. Our casing head is especially adapted to this use.

Having cemented, it is then necessary to bail the well down to see if the casing is tight and having determined that the casing is tight, the cement plug inside the casing and below the end thereof is then drilled out leaving the cement outside the casing intact. During the water testing our casing is especially valuable since, should the well show any tendency to get away from the drilling crew, it can be rapidly drowned out by pumping mud by means of the pump 90 down through the space outside the tubing and inside the casing, this mud serving to again supply the superhydrostatic pressure needed to prevent a premature flow of the well. The head can also be used to supply mud through the tubing for the purpose of measuring the number of barrels of mud the formation will take.

After the well has been drilled in, the valve 77 may be opened to allow fluid to flow freely between the casing and tubing, thus preventing excessive pressures building up in the well and allowing the operator to withdraw from the tubing the tools used for so drilling in the well, or the bailer if one is used. The valve 77 may then be closed, the valve 66 being closed, and the well held under complete control for the purpose of mudding up the formation, if desired, or for ordinary production purposes.

After the well is put upon production, the pipe 75 may be used to relieve gas pressure while the well is producing oil through the tubing 40. This is due to the fact that the oil enters the well through the sides and the gas tends to rise vertically thus coming up outside the tubing.

The advantages thus enumerated are due to the specific structure shown and described. The bonnet 50 serves to hold the tubing 40 down so that it cannot be blown from the well without also blowing out the casing which is very nearly impossible, due to the fact that the casing is not only cemented but also firmly locked in place by the formation about it. By anchoring the nipples 63 and 64 to the pipes 75 and 76 all the upper structure of pipes and valves carried on the tubing 40 is firmly locked to the casing and cannot be blown out.

The tubing ring 30 is for the purpose of supporting the tubing, the ring 20 being for the purpose of supporting the elevators or spiders, while the tubing is being run in or removed. The packing is so placed that it is not disturbed while the tubing is being run in or removed. The taper on the seat 53 is such that the tubing and head give a complete line up for any pumping or flowing connection desired. The cap screw 54 securely locks the tubing in the head so that it will not be turned while the outside connections are being put in place or being tightened.

By our invention a well can be held under perfect control during the difficult period following the actual cessation of drilling for the purpose of setting casing until the well is actually on production, and later if desired. The operator knows that his tubing cannot blow out since it is anchored to the casing, and he has full access to the space inside the casing and outside the tubing for the purpose of either relieving gas pressure therein or for the purpose of pumping fluid to build up a controlling pressure on the well, or for the purpose of mudding up. He is thus ready for any contingency that may arise.

Our invention has been found especially practical in the Santa Fe and Signal Hill fields of California which have large wells having very heavy gas pressure. One of the largest companies operating in these fields has adopted our device as standard and by its use has been able to efficiently and quickly bring in a number of very large wells with perfect safety and without loss of time or production.

We claim as our invention:

1. A casing head structure comprising: a member adapted to be attached to the top of the well casing and having a seat formed in the top thereof; a casing head ring resting on said seat and upon which a collar of the tubing may be supported; and means for engaging the top of said collar and said member.

2. A structure as in claim 1 in which said means comprises a bonnet threaded on said member and adapted to fit tightly about said collar.

3. A structure as in claim 1 in which said means comprises a bonnet threaded on said member and adapted to fit tightly about said collar, said bonnet having means for clamping said collar and preventing rotation thereof in said bonnet.

4. A structure as in claim 1 also comprising a tubing ring resting on said casing head ring and upon which the collar of said tubing may rest.

5. A structure as in claim 1 also including a pipe connected into said member below the point of attachment of said bonnet.

6. A structure as in claim 1 also including means for making a fluid tight joint between said member and said tubing.

7. A structure of the nature disclosed comprising: a member adapted to be attached to the top of a well pipe and having a concentric seat; means engaging said seat and centrally apertured for passage therethrough of a cylindrical member and adapted to entirely support said member and form a closure for the well casing; and means for preventing upward movement of said member and for making a fluid tight joint between said member and the closure means.

8. A structure as in claim 7 also including means for preventing rotation of said member.

In testimony whereof, we have hereunto set our hands at Los Angeles, California, this 21st day of September, 1922.

WILLIAM L. McLAINE.
WILLARD L. BOROUGH.